United States Patent [19]

Parsons

[11] Patent Number: 5,132,364
[45] Date of Patent: Jul. 21, 1992

[54] STABILIZATION OF POLYMERS CONTAINING AN UNSATURATED DICARBOXYLIC ACID ANHYDRIDE AS A COMPONENT

[75] Inventor: Charles F. Parsons, Little Hocking, Ohio

[73] Assignee: General Electric Company, N.Y.

[21] Appl. No.: 504,222

[22] Filed: Apr. 4, 1990

[51] Int. Cl.⁵ .................. C08L 35/04; C08L 37/00; C08L 51/04
[52] U.S. Cl. ........................... 525/74; 525/207; 525/285
[58] Field of Search .................. 525/74, 207, 285

[56] References Cited

U.S. PATENT DOCUMENTS

| | | | |
|---|---|---|---|
| 3,884,992 | 5/1975 | Shimizu et al. | 525/222 |
| 4,387,191 | 6/1983 | Dufour et al. | |
| 4,397,975 | 8/1983 | Harris . | |
| 4,433,086 | 2/1984 | Harris . | |
| 4,609,589 | 9/1986 | Hosoda et al. | 428/352 |
| 4,661,545 | 4/1987 | Bruis et al. . | |

*Primary Examiner*—Jacob Ziegler
*Attorney, Agent, or Firm*—Lowe, Price, LeBlanc & Becker

[57] ABSTRACT

Polymers and polymer blends containing, as a copolymerized constituent, an unsaturated dicarboxylic acid anhydride (such as maleic anhydride); and more particularly to stabilizing the same with poly(p-hydroxystyrene) and copolymers of p-hydroxystyrene and styrene to reduce splay and streaking during molding.

11 Claims, No Drawings

STABILIZATION OF POLYMERS CONTAINING AN UNSATURATED DICARBOXYLIC ACID ANHYDRIDE AS A COMPONENT

BACKGROUND OF THE INVENTION

1. Field of the Invention

Polymers and polymer blends containing, as a copolymerized constituent, an unsaturated dicarboxylic acid anhydride (such as maleic anhydride); and more particularly to methods of stabilizing the same to reduce splay and streaking during molding.

2. Description of the Prior Art

U.S. Pat. No. 4,433,086 (Harris I) recognizes the tendency of polymers containing maleic anhydride to decompose at high temperatures. Harris stabilizes the polymer with a tetrahalogenated aromatic dicarboxylic acid or anhydride.

U.S. Pat. No. 4,397,975 (Harris II) is directed to the same problem but uses a different stabilizer, such as an organic sulfonic acid.

U.S. Pat. No. 4,387,191 (Dufour et al) controls cross-linking in maleic anhydride/acrylonitrile containing polymer by the use of an acid ester of phosphorous acid, such as di-(2-ethyl-hexyl) monoacid phosphate.

U.S. Pat. No. 4,661,545 (Bruls et al) relates to a molding composition containing styrene and maleic anhydride together with a stabilizing amount of an organic phosphite ester.

DESCRIPTION OF THE INVENTION

The prior art referred to in the preceding section all deals with the well recognized problem inherent in polymers containing styrene and/or acrylonitrile and unsaturated dicarboxylic acids and anhydrides, specifically maleic anhydride. A variety of stabilizers have been used to reduce the splay or "silver streaking" that commonly occurs in such products when molded at the high temperatures recommended. Splay is a surface defect which sometimes is found in molded plastic parts. There are several causes of splay, the most common of which is moisture in the molding composition. This moisture flashes into vapor at the molding temperature and breaks through the surface of the part. In the case of maleic anhydride containing products, splay can be caused by the rupture of the anhydride ring with the creation of carbon dioxide. The carbon dioxide gas then migrates to and breaks the surface of the part in the same way the water vapor does in splay caused by insufficient drying. Splay appears to occur more frequently when the molding composition contains acrylonitrile and/or methyl methacrylate. Cross-linking and-/or chain scission may accompany the splay formation.

The present invention is based on the discovery that poly(p-hydroxy styrene) (PHS) and copolymers of PHS and styrene (PHS/S) are effective stabilizers for maleic anhydride containing molding compositions. A significant reduction in the presence of splay may be obtained by using such stabilizers.

PHS may be prepared by polymerizing p-acetoxystyrene (PAS) using a free radical initiator and then hydrolyzing the polymer to PHS. PAS may also be copolymerized with styrene or other monomers and then subjected to hydrolysis to produce copolymers in a similar manner.

The polymeric composition may be a single polymer or a blend of two or more compatible polymers. For example, the polymeric composition may be a terpolymer of styrene, acrylonitrile and maleic anhydride (SAMA). The latter may be blended with a graft acrylonitrile-butadiene-styrene polymer (ABS), polycarbonate, polycarbonate/ABS blends or modified, butadiene-containing rubbery polymers such as styrene-butadiene copolymer or acrylonitrile-butadiene copolymer. The SAMA is used primarily as a high heat additive i.e. one which raises the heat deflection temperature of the composition. See U.S. Pat. Nos. 4,634,732 and 4,886,885.

Molding conditions for maleic anhydride containing products must be tightly controlled to prevent splay. In general, producers of ABS/maleic anhydride products (e.g. Cadon (®) from Monsanto Company) recommend that the melt temperature be maintained below 510° F. SAMA/ABS blends made without the PHS of the present invention have been processed up to 525° F. without problems. However, severe splay occurs at higher temperatures.

DESCRIPTION OF THE PREFERRED EMBODIMENTS

Example 1

A styrene/acrylonitrile/maleic anhydride terpolymer (SAMA 1) was prepared under steady state conditions in a single reactor. Monomer feed was about 81 wt % styrene; 9 wt. % acrylonitrile and 10–11% wt % maleic anhydride. The reaction was continued until about 50% of the monomers were converted to polymer. The product was then transferred to a devolatilizer where the unreacted styrene and acrylonitrile were removed and recycled back to the reactor vessel.

Using a differential scanning calorimeter (DSC) it was determined that very little, and possibly no styrene/acrylonitrile copolymer was present in the terpolymer as noted by the absence of a glass transition temperature ($T_g$) at 104°–108° C.

Example 2

Another terpolymer (SAMA 2) was prepared in a two reactor system by taking the polymerization steps described in Example 1 through the conversion of 50% and then introducing the entire mass, which included the reacted and unreacted components, into a second reactor. Polymerization was continued in the second reactor until substantially all of the monomers were reacted. This sample contained about 50 wt. % styrene-acrylonitrile copolymer and had two distinct $T_g$'s as determined by the DSC.

Example 3

A graft ABS polymer was prepared by conventional emulsion polymerization, said graft containing about 50 wt % butadiene; 37 wt % styrene and 13 wt % acrylonitrile. A wide range of graft ABS polymers may be made by known techniques.

Styrene resins suitable for use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

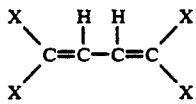

wherein X is selected from the group consisting of hydrogen, alkyl groups containing from one to five carbon atoms, chlorine or bromine. Examples of dienes that may be used are butadiene, isoprene, 1,3-heptadiene, methyl-1,3 pentadiene, 2,3-dimethyl-1,3-butadiene, 2-ethyl-1,3 pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

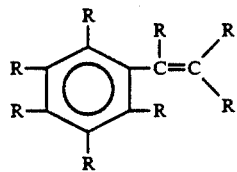

wherein R is selected from the group consisting of hydrogen, alkyl groups of 1 to 5 carbon atoms, cycloalkyl, aryl, alkaryl, aralkyl, alkoxy and halogen. Accordingly the compounds include styrene, 4-methylstyrene; 3,5-diethylstyrene, 4-n-propylstyrene, α-methylstyrene, α-methyl vinyltoluene, α-chloro-styrene, -bromostyrene, dichlorostyrene, dibromostyrene, tetra-chlorostyrene, mixtures thereof, and the like. The preferred monovinylaromatic hydrocarbons used are styrene and-/or -methylstyrene.

A second group of monomers that may be polymerized in the presence of the prepolymerized backbone are acrylic monomers such as acrylonitrile, substituted acrylonitrile, and/or acrylic acid esters, exemplified by acrylonitrile, and alkyl acrylates such as methyl methacrylate.

The acrylonitrile, substituted acrylonitrile, or acrylic acid esters are described generically by the following formula:

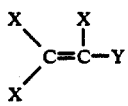

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroarylonitrile, β-chloroacrylonitrile, α-bromoacrylonitrile, and β-bromoacrylonitrile, methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprises from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methyl styrene-acrylonitrile, is added to the graft polymer copolymer blend. When a graft is polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

Example 4

In order to demonstrate the improved stability of resins using PHS and PHS copolymers, a small twin screw extruder was used to compound selected materials into SAMA 1 and SAMA 2 prepared in accordance with Examples 1 and 2 respectively. A disc mold was used for the detection of splay. The particular mold produces a broad melt front as it fills with molten plastic. A short shot, or partial filling of the mold, provides the most sensitive circumstances to observe splay or bubble formation. In addition, a slow fill speed (injection time or rate of melt fill) allows time for the decomposition of the SAMA polymers with concomitant bubble formation. Fill speed is a very important variable in respect to splay.

Since most work in connection with stabilizing polymers with maleic anhydride have used conventional additive, several samples were prepared using such additives as controls. The recipes are set forth in Table I below:

TABLE I

| Sample | A | B | C | D | E |
|---|---|---|---|---|---|
| SAMA 2 | 100 | 100 | 100 | — | 100 |
| AMSAN | — | — | — | 100 | — |
| Additive 1 | 0.5 | — | — | — | — |
| Additive 2 | — | 0.5 | — | — | — |
| Additive 3 | — | — | 0.5 | — | — |

Notes:
AMSAN = α-methyl styrene/acrylonitrile copolymer containing no maleic anhydride
Additive 1 = 1,3,4-trimethyl-2,4,6-tris(3,5-di-tert. butyl-4-hydroxy benzyl) benzene (Ethyl 330- Ethyl Corporation)
Additive 2 = Ethylene bis stearamide (EBS Wax)
Additive 3 = dilauryl thiodipropionate Parts molded from the polymers A-E were examined for splay. The results are set forth in Table II.

TABLE II

| Sample | Comment |
|---|---|
| A | Splay present when molded at 535° F. |
| B | Splay on a partially filled disc molded at 525° F. |
| C | Splay present when molded at 535° F. |
| D | No splay at when molded at 550° F. |
| E | Same as B |

Example 5

Samples were prepared using PHS homopolymer and PHS/S copolymer blended with SAMA 2. The additive and the SAMA 2 were compounded in the 28 mm. twin screw extruder from which discs were molded in the same manner described above.

The recipes (in parts by weight) for each sample are set forth in Table III below:

TABLE III

| Sample | F | G | H |
|---|---|---|---|
| SAMA 2 | 100 | 100 | 100 |
| PHS | — | 2 | — |
| PHS/S | — | — | 2 |

The control, Sample F, showed splay at 525° F. as in the earlier example. Sample G had just a trace of bubbles at the same conditions while Sample H showed absolutely no splay at all.

Example 6

Additional samples were prepared comparing the splay reduction of hydroquinone (HQ), another known stabilizer, with PHS and PHS/S. The recipes (parts by weight) are shown in Table IV.

TABLE IV

| Sample | I | J | K | L |
|---|---|---|---|---|
| SAMA 2 | 100 | 100 | 100 | 100 |
| HQ | 1 | — | — | — |
| PHS | — | 1 | 2 | — |
| PHS/S | — | — | — | 1 |

A full disc molded with the polymer of Sample I had a few small bubbles when molded at 550° F. and fast fill conditions. The same test was repeated using slow fill and had considerable splay in both the full and partially filled discs. Filling at high speed eliminated the splay at 535° F. Samples J, K and L had no splay at normal fill speeds at 550° F. Sample L first showed splay at 535° F. with partial shots and slow fill speed. The same effect was also found with Samples J and K.

Example 6

Additional tests were performed on the other terpolymer, SAMA 1, described in Example 1 which contained 20% maleic annhydride. The recipes are set forth in Table V (parts by weight):

TABLE V

| Sample | L | M |
|---|---|---|
| SAMA 1 | 100 | 100 |
| PHS | 1 | 2 |

SAMA 1 discs had less splay at 535° F. than SAMA 2 discs. There was a small amount of splay in the partially filled discs when molded at 535° F. but not much more was evident when molding at 550° F., indicating stability over a wide temperature range. Fast fill, full shots at 550° F. did not show any splay while slowly filled full discs at the same temperature did have a minor amount.

Example 7

There are many compositions used as heat stabilizers in various polymers. These include hindered phenolics, phosphites and the like. Several known stabilizers were examined for their efficacy in reducing splay. The recipes for six samples so tested are set forth in Table VI below.

TABLE VI

| Sample | N | O | P | Q | R | S |
|---|---|---|---|---|---|---|
| SAMA 2 | 100 | → | → | → | → | → |
| Additive 1 | 1 | — | — | — | — | — |
| Additive 2 | — | 1 | — | — | — | — |
| Additive 3 | — | — | 1 | — | — | — |
| Additive 4 | — | — | — | 1 | — | — |
| Additive 5 | — | — | — | — | 1 | — |
| Additive 6 | — | — | — | — | — | 1 |

Notes:
Additive 1 = BHA (2 and 3-t-butyl-4-hydroxyanisole)
Additive 2 = 2-t-butyl-6-(3-t-butyl-2-hydroxy -5 methyl benzyl)-4-methyl phenyl acrylate (Sumilizer GM-Sumitomo Chemical); CAS # 61167-58-6
Additive 3 = tetrakis[methylene (3,5-di-t-butyl hydroxyphenyl) propionate] methane (Irganox 1010- Ciba-Geigy); CAS # 6683-19-8
Additive 4 = 1,3,5-tris(3,5-di-t-butyl-4-hydroxylbenzyl) isocyanurate (Good-Rite 3114 B.F. Goodrich) CAS # 27676-62-6
Additive 5 = 2,6-di-t-butyl-p-cresol (BTH); CAS # 128-37-0
Additive 6 = octadecyl 3,5-di-t-butyl-4-hydroxyhydro-cinnamate (Irganox 1076-Ciba-Geigy) CAS # 2082-79-3

Sample R containing BTH showed the worst splay at 535° F. All were worse than the PHS and PHS/S discs at 535° F.

Example 7

SAMA 2 was compounded with the ABS from Example 3 using 75 parts SAMA 2 and 25 parts ABS. This compound was then mixed with PHS and PHS/S and compared with a control containing no stabilizing additives. The recipes are set forth in Table VII below.

TABLE VII

| Sample | U | V | W | X | Y |
|---|---|---|---|---|---|
| SAMA/ABS | 100 | → | → | → | → |
| PHS | — | 1 | 2 | — | — |
| PHS/S | — | — | — | 1 | 2 |

The control, Sample U, showed splay on the disc's surface when molded at 535° F. None of the Samples containing PHS or PHS/S showed any splay or streaking when molded at 550° F.

While this invention has been described in connection with certain specific embodiments, it is understood that the scope of the invention be determined by the appended claims.

What is claimed is:

1. A stabilized thermoplastic molding composition, comprising at least one thermoplastic polymer which comprises an unsaturated dicarboxylic acid anhydride and which has a tendency to decompose or crosslink at elevated temperatures, and a polymer stabilizer selected from the group consisting of poly (p-hydroxystyrene) and copolymers of p-hydroxystyrene and styrene, the polymeric stabilizer being included in an amount which reduces the tendency of the polymer comprising the unsaturated dicarboxylic acid anhydride to decompose or crosslink at elevated temperatures.

2. The composition of claim 1, wherein said polymeric stabilizer is a homopolymer of p-hydroxystyrene.

3. The composition of claim 1, wherein said polymeric stabilizer is a copolymer of p-hydroxystyrene and styrene.

4. The composition as defined in claim 1, wherein said polymeric stabilizer is present in the amount of 0.5 to 3 wt %, based on the total weight of the molding composition.

5. A thermoplastic molding composition comprising: A) a thermoplastic terpolymer of 1) a monovinylaromatic compound, 2) an unsaturated nitrile, and 3) an unsaturated dicarboxylic acid anhydride; and B) a polymeric stabilizer which is selected from the group consisting of 1) a homopolymer of p-hydroxystyrene and 2) a copolymer of p-hydroxystyrene and styrene, and which is included in an amount sufficient to reduce a tendency of the terpolymer to decompose or crosslink at elevated temperatures.

6. The composition defined in claim 5, wherein said monovinylaromatic compound is styrene.

7. The composition as defined in claim 6 wherein said unsaturated nitrile is acrylonitrile.

8. The composition as defined in claim 7 wherein said unsaturated dicarboxylic acid annhydride is maleic anhydride.

9. The composition as defined in claim 8 wherein said polymeric stabilizer is poly (p-hydroxystyrene).

10. The composition as defined in claim 8 wherein said polymeric stabilizer is a copolymer of p-hydroxystyrene and styrene.

11. A thermoplastic polymer composition, comprising at least one thermoplastic polymer which comprises an unsaturated dicarboxylic acid anhydride and which has a tendency to decompose or crosslink at elevated temperatures, a polymeric stabilizer selected from the group consisting of poly (p-hydroxystyrene) and copolymers of p-hydroxystyrene and styrene, the polymeric stabilizer being included in an amount which reduces the tendency of the polymer comprising the unsaturated dicarboxylic acid anhydride to decompose or crosslink at elevated temperatures, and a graft copolymer comprising styrene and acrylonitrile grafted to a rubber substrate comprising polybutadiene.

* * * * *